United States Patent [19]

Karpal

[11] 4,237,202
[45] Dec. 2, 1980

[54] AIRCRAFT BATTERY
[75] Inventor: David L. Karpal, Redlands, Calif.
[73] Assignee: Teledyne Industries, Inc., Los Angeles, Calif.
[21] Appl. No.: 959,855
[22] Filed: Nov. 13, 1978
[51] Int. Cl.² ............................................. H01M 2/02
[52] U.S. Cl. .................................. 429/120; 429/148; 429/163; 429/176
[58] Field of Search ................ 429/120, 176, 186, 99, 429/100, 8, 148, 159, 163, 168

[56] References Cited
U.S. PATENT DOCUMENTS

| | | | |
|---|---|---|---|
| 2,054,699 | 9/1936 | Geyer | 429/176 |
| 2,379,189 | 6/1945 | Rupp | 429/177 X |
| 2,410,952 | 11/1946 | Lighton | 429/186 X |
| 2,740,824 | 4/1956 | Stanimirovitch | 429/120 |
| 2,812,378 | 11/1957 | Barrett | 429/99 |
| 3,264,140 | 8/1966 | Gohle | 429/186 X |
| 3,388,007 | 6/1968 | Fiandt | 429/176 X |
| 3,745,048 | 7/1973 | Dinkler et al. | 429/120 |
| 4,053,683 | 10/1977 | Rounds | 429/8 |

Primary Examiner—Anthony Skapars

[57] ABSTRACT

An aircraft battery having a polypropylene casing for receiving the lead plates and acid therein, the casing being configured to fit closely within and be bonded to an aluminum housing and having a thickened base portion with individual cells formed by polypropylene walls to provide improved insulation while maintaining the light weight and the structural integrity of the casing.

4 Claims, 5 Drawing Figures

AIRCRAFT BATTERY

BACKGROUND OF THE INVENTION

The background of the invention will be discussed in two parts:

FIELD OF THE INVENTION

This invention relates to aircraft batteries, and more particularly, to lead-acid aircraft batteries encased in aluminum housings.

DESCRIPTION OF THE PRIOR ART

In prior art aircraft batteries, a lead-acid battery having a thick-walled carbon impregnated rubber casing is placed within an aluminum housing and the casing cover is flooded with an epoxy layer. The selection of materials for the casing and housing is usually made on the basis of coefficients of thermal expansion of the two materials, it being desirable that the coefficients be similar if not identical. However, the extreme temperature variations to which an aircraft battery is subjected in use often cause separation of the epoxy and the casing from the housing, endangering the mechanical and electrical integrity of the battery and the safety of the airplane.

Recently, an improved aircraft battery has been devised which uses a relatively thin-walled molded polypropylene battery casing sealed at a peripheral ridge to the aluminum housing to provide substantially lighter weight, improved thermal coefficient characteristics and, consequently, improved electrical and mechanical integrity.

Although such a battery is substantially lighter than prior art batteries utilizing carbon-impregnated rubber casings, even this improved battery has insulation characteristics which might be improved.

It is an object of this invention to provide a new and improved lead-acid aircraft battery.

It is another object of the present invention to improve the insulating characteristics of light weight lead-acid aircraft batteries without reducing their mechanical or electrical integrity.

An additional object of this invention is to provide a new and improved polypropylene casing for a lead-acid aircraft battery.

SUMMARY OF THE INVENTION

The foregoing and other objects of the invention are accomplished by a lead-acid aircraft battery having a relatively thin-walled molded polypropylene battery casing and cover in one piece sealed to an aluminum housing by a silicon adhesive contained between a peripheral ridge and the interior wall of the housing. Weight reduction is maintained by molding the bottom of the casing in a configuration which provides a series of spaces separated by polypropylene walls which entrap air for insulation and maintain the structural integrity of the casing.

Other objects, features and advantages of the invention will become apparent from a reading of the specification taken in conjunction with the drawings in which like reference numerals refer to like elements in the several views.

DESCRIPTION OF THE PREFERRED EMBODIMENT

Figure 1:
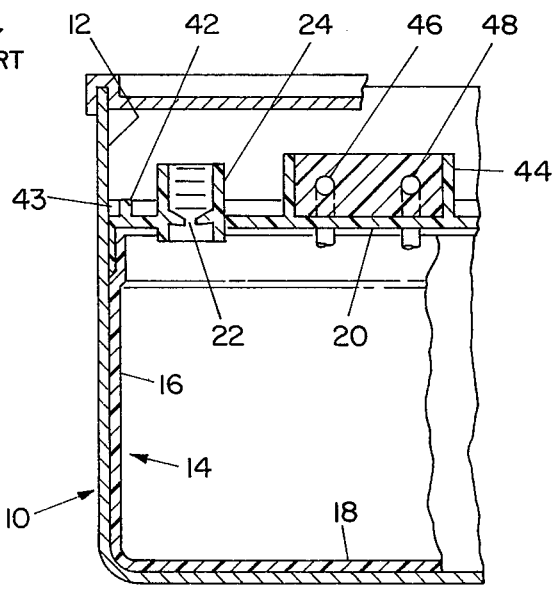
FIG. 1 is a partial cross sectional view of a prior art lead-acid aircraft battery with a polypropylene casing.

Referring now to the drawings and more particularly to FIG. 1, there is shown, in cross section, a portion of a prior art lead-acid aircraft battery (disclosed in U.S. patent application Ser. No. 929,345, filed July 31, 1978 by David L. Karpal), the battery including an aluminum housing generally designated 10 having an open top 12 being generally rectangular in form for receiving therein a battery casing generally designated 14, the battery casing 14 having side walls 16, a bottom 18 and a top cover 20.

For ease of illustration, the lead plates of the battery have been removed, it being understood that in conventional practice, each cell of the battery includes a cell aperture 22 passing through a neck 24 for introducing the acid into the battery after assembly. The neck 24 is integrally formed with the cover portion 20 of the casing 14 and extends above the plane of the cover 20 thereof.

The casing 14 is formed of a generally thin-walled polypropylene composition. The casing 14 and casing cover 20 may be molded, and casing cover 20 may be suitably secured to casing 14 such as by ultrasonic welding or sealing to form a container for receiving the lead plates (not shown). The cover 20 is likewise formed of a polypropylene material of relatively thin cross section with integrally molded necks 24 having cell apertures 22 extending therethrough.

The cover 20 is also provided with a peripheral barrier or ridge portion 42 adjacent the edge thereof, and with the casing 14 and cover 20 fitted within the housing 10, the ridge 42 is in spaced proximate relation to the interior surface of the housing 10. The housing 10 may be additionally provided with a polyvinylchloride coating for further protection of the assembled unit.

Once the battery casing 14 is positioned within the housing 10, a silicon sealant or adhesive bead 43 is inserted into the channel formed between the ridge 42 and the side wall of the adjacent housing 10 to seal the assembled battery container within the housing 10, thereby resulting in a minimal amount of sealant required for assembly, resulting in a positive bonding and sealing arrangement as well as reducing the amount and consequently the weight of sealant required. This, in conjunction with the thin-walled polypropylene material utilized for the casing 14 and cover 20 of the same dimensions result in an overall weight reduction of approximately 2.6 kilograms in a particular battery, the casing 14 and cover 20 in polypropylene material weighing in contrast, only approximately 1 kilogram.

Figure 2:
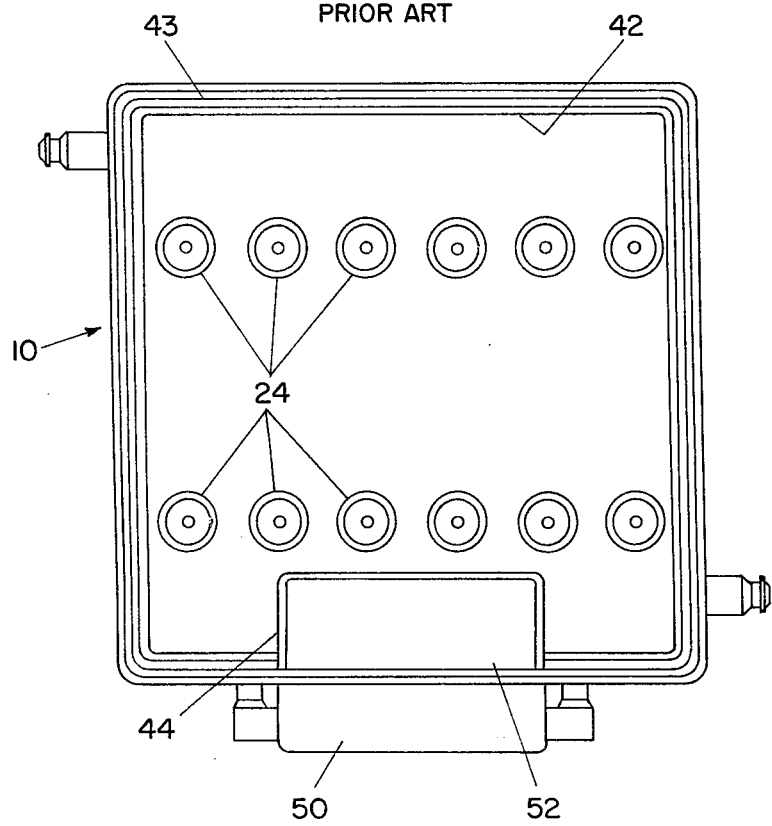
FIG. 2 is a top view of a lead-acid aircraft battery in accordance with the prior art.

To ensure the mechanical integrity as well as the electrical integrity of the terminal portion of the battery, a ridge or fence 44 of generally C-shaped configuration is formed integrally with the upper surface of the cover 20 adjacent one end thereof or generally surrounding the electrical terminals 46 and 48 which may ultimately bend outwardly to pass through a terminal junction box 50 (see FIG. 2) formed in the side of housing 10 for ultimate connection to the electrical system of the aircraft.

Figure 3:
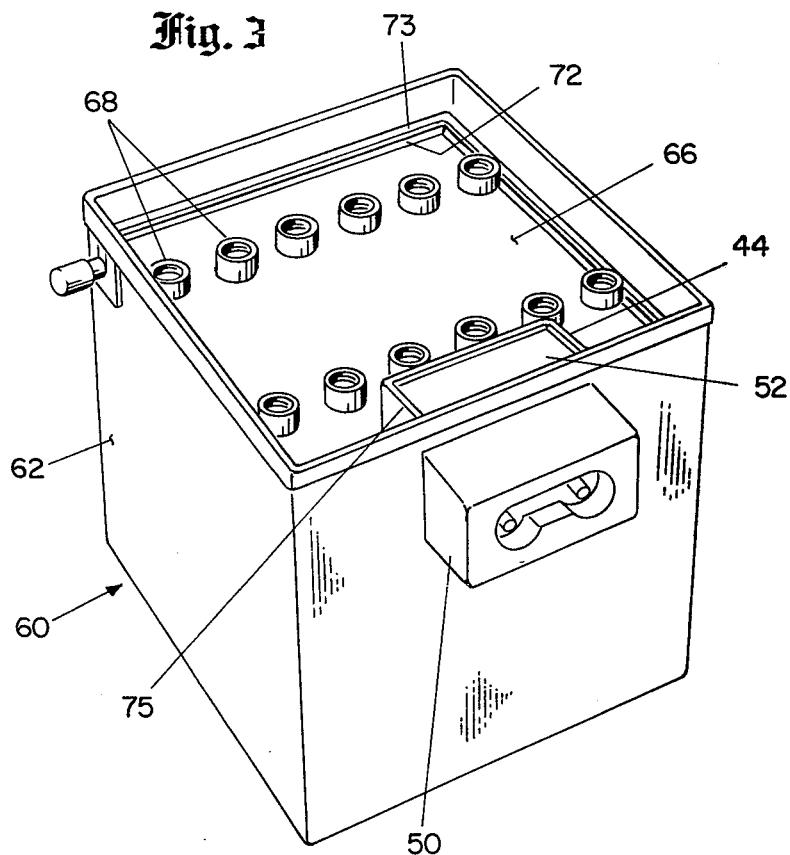
FIG. 3 is a perspective view of a lead-acid aircraft battery in accordance with the invention.

As can better be seen in FIG. 3, the fence 44 has the open end thereof abutting against the interior adjacent side wall of housing 10 for forming an open-topped compartment having an overall configuration for generally surrounding the terminals 46 and 48. Into this compartment, an epoxy layer 52 is inserted for suitably encapsulating the terminals 46 and 48 to thereby provide structural strength as well as electrical integrity at the terminal portion of the assembled unit. The total amount of epoxy utilized within the compartment formed by fense 44 is significantly less than the amount of epoxy previously required when "flooding" the battery casing with epoxy as in the prior art, notwithstanding the increased height of the fence 44, which rises above the terminal ends of the necks 38 of the cover 36. This additional height provides additional structural strength to the terminal area.

In addition to the consequent weight savings, the ultilization of a thin-walled polypropylene material for the casing 14 which is in close abutting relation to the interior surfaces of the housing 10 enables the casing 14 to readily dissipate rapid heat changes to which the housing 10 may be subject when used in the aircraft. Furthermore, the silicon adhesive bead 43 effectively seals and bonds the casing 14 and cover 20 combination to the interior housing 10 resulting in virtually no separation, thus resulting in a more reliable lead-aircraft battery assembly of significantly reduced weight.

Although substantial weight reduction is obtained by the use of polypropylene casings, an aircraft battery is subject to such a wide range of operating temperatures that improved insulating qualities will greatly extend its life and reliability of operation. This invention provides this advantage.

Figure 4:
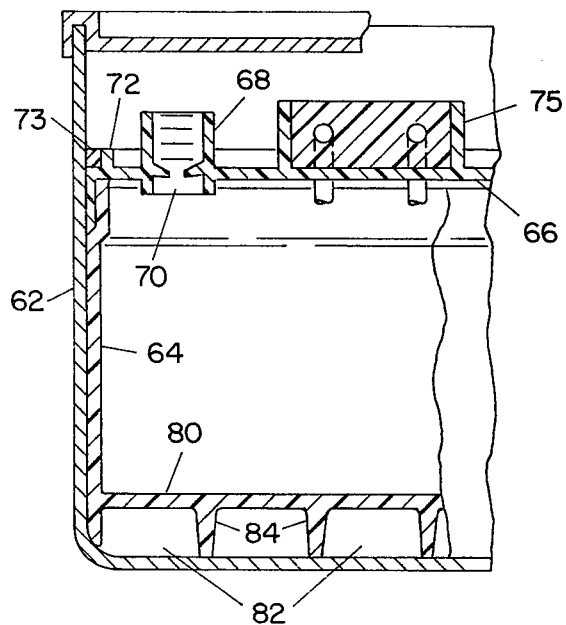
FIG. 4 is a partial cross sectional view of a lead-acid aircraft battery in accordance with the invention.
Figure 5:
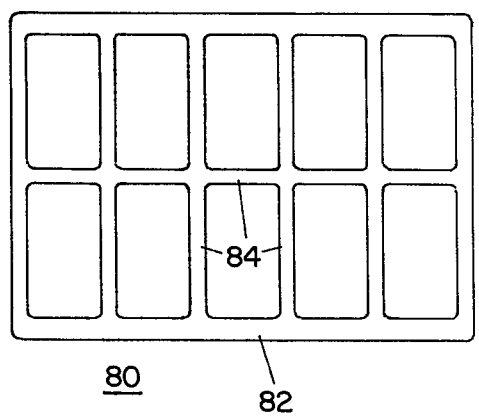
FIG. 5 is a bottom view of the casing of the aircraft battery of FIGS. 3 and 4.

As shown in FIGS. 3, 4 and 5, the present invention is an improved lead-acid aircraft battery generally designated 60 having an outer aluminum housing 62 configured to receive therein a casing 64 which may be formed of a generally thin-walled polypropylene composition. The casing 64 may be molded by various well-known techniques and a molded casing cover 66 suitably secured thereto by well-known sealing techniques such as ultrasonic welding thereby forming a container for receiving lead plates (not shown). The cover 66 may also be molded by known techniques from a polypropylene material of relatively thin cross section and have molded necks 68 with cell apertures 70 extending therethrough.

As with the prior art batteries described above, the cover 66 may be provided with a peripheral barrier ridge 72 adjacent its edge and have a silicon sealant 73 inserted into the channel formed between barrier ridge 72 and the aluminum housing 62 to seal the casing 64 to the housing 62. It should be noted that housing 62 may be coated with polyvinylchloride for further protection of the assembled unit. A ridge 75 adapted to contain an epoxy to protect the electrical terminals may also be formed in cover 66.

The bottom 80 of the casing 64 of the present invention is molded in a shape to provide additional insulation without increasing the weight of the battery. As may be seen in FIGS. 4 and 5, the bottom 80 of casing 64 is formed, preferably by molding, to have a number of generally rectangular air spaces 82 separated by polypropylene walls or webs 84. The air spaces 82 provides substantial additional insulation between the aluminum housing 62 and the casing 64 thereby reducing the transfer of changes in temperature to the chemically active portion of the battery 60. The provision of air spaces 82 also eliminates a substantial portion of the contact surface between housing 62 and casing 64 thereby eliminating some points at which mechanical distortion of either surface might affect the structural integrity of the battery 60. As will be understood, the dimensions of walls 84, their separation, and their height are chosen to provide sufficient strength for support in the particular battery. In one particular aircraft battery having external dimensions of approximately 21.6 cm by 24.1 cm by 25.4 cm, the width of walls 84 are selected to be approximately 0.25 cm., while spaces 82 are chosen to be approximately 12 cm. by 4.1 cm. Because of the particular configuration, a battery having a bottom 80 in accordance with the invention will be of approximately the same weight as those prior art batteries shown in FIGS. 1 and 2 while providing significantly better insulation.

In a particular embodiment, not shown, it may be desirable to utilize a like insulating design in the walls of the casing in order to provide additional insulating properties. Such a casing would obviously have a reduced interior volume for a particular set of external dimensions.

The invention disclosed herein provides improved insulation, minimum weight, and improved structural integrity for use in aircraft. While a preferred embodiment has been shown and described, it is to be understood that various other adaptations and modifications may be made within the spirit and scope of the invention by those skilled in the art.

What is claimed is:

1. An aircraft battery having an external metallic housing, a casing of thin-walled polypropylene material configured to fit tightly within the metallic housing for containing the chemical reactants therein; and means for insulating a portion of the interior of the casing from the housing.

2. An aircraft battery as in claim 1 in which said means for insulating a portion of the interior of the casing is structurally affixed to the bottom of said casing.

3. An aircraft battery as in claim 1 in which said means for insulating a portion of the interior of the casing comprises webs of polypropylene extending from the surface of said casing adjacent said housing.

4. An aircraft battery as in claim 2 in which said means for insulating a portion of the interior of the casing comprises essentially rectangular walls of polypropylene material extending from said casing.

* * * * *